United States Patent [19]

Steele et al.

[11] Patent Number: 5,216,515
[45] Date of Patent: Jun. 1, 1993

[54] ADDRESSABLE VIDEO FEED SYSTEM

[75] Inventors: Gerald G. Steele, Oakland; Thomas J. Stump, Walnut Creek; James Kraenzel, Groveland, all of Calif.

[73] Assignee: Adexpress Company, Dublin, Calif.

[21] Appl. No.: 704,598

[22] Filed: May 23, 1991

[51] Int. Cl.⁵ .............................................. H04N 5/76
[52] U.S. Cl. ...................................... 358/335; 358/86; 455/2
[58] Field of Search .................. 358/84, 86, 335, 310, 358/342, 186; 360/33.1, 35.1; 455/2, 3.1, 3.2, 3.3, 4.1, 4.2

[56] References Cited

U.S. PATENT DOCUMENTS

| | | | |
|---|---|---|---|
| 4,720,873 | 1/1988 | Goodman et al. | 455/2 |
| 4,724,491 | 2/1988 | Lambert | 358/310 |
| 4,814,883 | 3/1989 | Perine et al. | 358/181 |
| 5,029,014 | 7/1991 | Lindstrom | 358/342 |
| 5,029,232 | 7/1991 | Nall | 455/2 |

*Primary Examiner*—Tommy Chin
*Assistant Examiner*—Robert Chevalier
*Attorney, Agent, or Firm*—S. Caserza

[57] ABSTRACT

A novel cable interconnect system provides for the overnight delivery of advertising messages to optical disc libraries located at cable headends and for the automated and customized insertion of ads on a plurality of cable systems throughout a wide geographic area. A verification and accounting system provides ad run verification and accounting information. The cable interconnect enables the delivery of commercial messages, for example via satellite, on an overnight basis from a central control facility to cable television system headends located in any desired geographic area such that a large number of cable television systems can receive the video ads simultaneously.

8 Claims, 2 Drawing Sheets

ADDRESSABLE VIDEO FEED SYSTEM

TECHNICAL FIELD

This invention pertains to video systems and more specifically to the video systems for addressably downloading selective video signals to a plurality of remote sites, for example, for use in inserting desired commercials or other video matter into one or more network feeds at a plurality of remote locations.

BACKGROUND

The procedures for purchasing cable time for advertising messages and the related production and verification process for these purchases is currently adequate for national network advertisers. However, the procedures for the purchase of spot time on individual cable systems is cumbersome, inefficient and, in instances, nonexistent. A significant spot advertising purchase on cable involves dealing with numerous cable system operators. To purchase a spot program on cable that would reach a majority of subscribers in the top 30 markets in the United States would require an advertising agency to deal with approximately 500 individual cable systems—some of which do not now have ad insertion equipment, or, in instances where they do, are able to insert ads on only a limited number of channels.

While certain cable systems are linked by cable interconnects that make the process more efficient, all of these interconnects cover only a limited region and few of them have demonstrated effective delivery capabilities. Advertising agencies making a significant spot buy on cable television today must deal with the mechanics of scheduling ads on multiple systems and of physically delivering multiple commercial ad tapes to systems and interconnects located in remote locations throughout the country.

Another significant problem that advertisers and their agency representatives currently confront with spot advertising on cable is that the follow-up verification and accounting systems of cable operators and inter-connects are uniformly unacceptable. Frequently agencies are unable to confirm that commercial messages ran at a particular time on a particular channel on a particular system. The receipt of separate invoices from numerous cable operators and inter-connects is another negative frequently cited by advertising agencies.

It is known in the prior are to utilize ad insertion equipment at cable television system headends utilizing video tape storage media and computer control. Such systems provide adequate video quality, but are not random accessed video storage media. Thus, in one such prior art system, a large plurality of video tape drives are used and periodically loaded with adequate tapes for a given period of time. In another prior art system, advertisements are downloaded to the headends of more than one cable system in a given region, but the advertisements are downloaded serially and identically at each cable television system headend, making it difficult to custom tailor advertising needs of each cable television system.

SUMMARY OF THE INVENTION

In accordance with the teachings of this invention, a novel cable interconnect system is taught, that provides for the overnight delivery of advertising messages to optical disc libraries located at cable headends and for the automated and customized insertion of ads on a plurality of cable systems throughout a wide geographic area. A verification and accounting system is taught which provides ad run verification and accounting information.

This cable interconnect enables the delivery of commercial messages, for example via satellite, on an overnight basis from a central control facility to cable television system headends located in any desired geographic area. In one embodiment, the interconnect system is entirely automated at each cable system headend.

The central control facility includes tape editing and tagging equipment, some production capability, and a video distribution capability for periodic transmissions to participating cable headends. IN one embodiment, this video distribution is performed via satellite such that a large number of cable television systems can receive the video ads simultaneously. In one embodiment of this invention, these ads are transmitted at night, during low priority transmission time. This central control facility also contains a sophisticated traffic control system that provides for ad run verification and for accounting and invoicing. In one embodiment, this traffic control provides that the ad run verification and accounting and invoicing information is provided from the headends to the central control facility on a daily basis.

Participating cable system headends include video storage media, such as state-of-the-art "write many" optical disc recorders/players, as well as switching equipment and ad insertion equipment. Controllers at the headends serve to communicate with traffic control systems at the central control facility.

Figure 1:
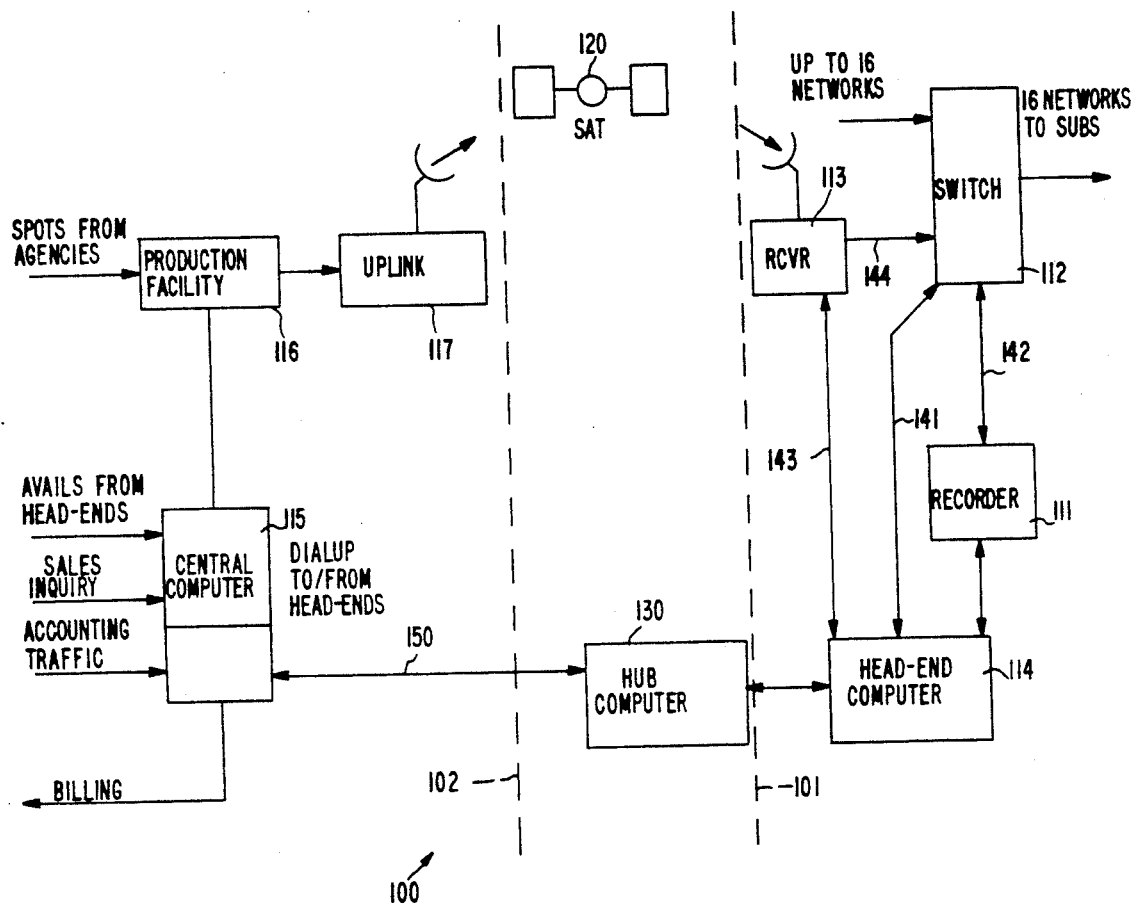
FIG. 1 is a block diagram depicting one embodiment of this invention.

DESCRIPTION OF SPECIFIC EMBODIMENTS
System Operation

In operation, an advertiser who has purchased a cable spot advertising schedule need deliver only one videotape to central control facility 102, from which is made the distribution of the advertisement to all desired cable systems. Central control computer 115 uniquely "tags" the advertisement and places the tagged advertisement in a library of advertisements that will be delivered to cable system headends 101 on off-hour time through, for example, satellites. The use of one satellite allows total coverage of the Continental United States. The use of additional satellites allows coverage of other geographic areas, as might be desired. Leased telephone lines (not shown) allow central control facility 102 to inexpensively transmit instructions to a headend computer 114 at each headend location 101 as to which of the commercials on the transmitted library should be stored on that headend's recorder/player 111. Central control facility 102 also transmits to headend computer 114 specific instructions as to when and on what channel to play the recorded advertisements. Based on these instructions, ad insertion equipment automatically inserts advertisements at appropriate times.

Since ads are likely to be inserted on multiple cable channels at a given headend location, the same commercial message may be scheduled for different cable channels during closely approximate time sequences. Also, there may be instances when different commercial messages are scheduled to be aired at closely approximate times. Furthermore, there are certain cable networks where the timing of advertising "slots" is not predictable—for example, sports programs. While these time slots are set, they can and do vary based on programming and technical uncertainties. In one embodiment of this invention, recorder/player 111 comprises an optical disk device, as for example available from Panasonic, which provides many important advantages compared to prior art ad insertion equipment which utilizes video tape recorders. In an alternative embodiment, recorder/player 111 comprises computer disk storage of digitized video. These advantages of the use of optical disk or computer disk storage technology include superior picture quality, significantly greater reliability, and substantially faster shuttle time as compared with video tape devices. The deminimus "shuttle time" of optical disc technology, together with ad insertion optimizing programs, virtually eliminates the number of "makegoods" necessary for spots missed due to player availability or collisions (breaktime overlap). In certain high priority headends, two or more optical discs are installed so as to further reduce, if not eliminate, such collisions.

From the viewpoint of participating cable operators, very little space at headend 101 is required for this system and the system of this invention requires no operating or maintenance time of the cable operator's employees.

Verification equipment is placed at the central control facility 102 and at headends 101 of participating cable systems. This equipment enables verification of when commercial messages were aired and information for accounting and invoicing purposes. This information typically includes title or other indicia of the commercial played, and quality of the playback. In one embodiment, this verification is performed within a short period of time, for example, 24 hours. In this embodiment, this next-day reporting surpasses the current capabilities of the Broadcast industry and is of vital interest to advertising agencies.

In accordance with the teachings of this invention, national advertisers are provided with an on-line inventory of local avails. This on-line inventory of avails provides instantaneous information on what local inventory is available and the pricing of this inventory. With this on-line system, avail commitments are easily and quickly provided to advertisers and their agency representatives. The system of this invention also offers advertisers a delivery system for cable commercials that make a cable spot advertising purchase easier and more efficient than a current Broadcast spot purchase. The advertiser need deliver only one commercial tape to the central control facility, regardless of the number of locations that ultimately will air the commercial. Advertisers can target smaller geographic and demographic markets, they can more easily effect cross-cable network advertising purchases, and they can more efficiently conduct test marketing. Advertisers are able to change commercial messages more quickly in response to market reactions. The quality of transmission provided by the satellite-to-optical disc system provides consistently higher advertising video quality than prior art which included the manual delivery and use of multiple generation tape.

Hardware Description

FIG. 1 is a diagram of one embodiment of a system 100 constructed in accordance with the teachings of this invention showing components at one headend 101 as well as central components at central control facility 102.

Headend Recorder/Player

Video recorder/player 111 is capable of recording commercials from an external source and playing them back on command. In one embodiment, an optical disc recorder/player is used as video/recorder/player 111, providing playback quality superior to that of currently used VTRs. One embodiment of such an optical disk recorder/player is available from Panasonic. The optical disk recorder/player has the capability to be all or partially erased on command and the erased disk area rewritten. The set up time for the optical disk machine is such that once a cue tone is received from the network where a commercial is to inserted there is ample time to position the disk to the proper position for play. This is also true for the write function. The machine utilizes laser magneto optical disk technology. The disk is arbitrarily segmented into 15 second units (30 frames per second). Commercials are written into any available segment for future play-back. Recorder/player 111 is under the control of headend computer 114 and commands are executed based on computer instructions. One or more recorder/player machines 111 are utilized at headend 101 depending on the commercial needs. For example, for a typical cable system utilizing fifteen (15) video channels, at least two optical disks are preferably utilized so that great flexibility is provided in allowing commercials to be played simultaneously on more than one video channel, and in rapid succession among various video channels.

Recorder/player 111 has a link 142 to video switch 112 for video and audio insertion of a video spot stored on recorder/player 111 on a network (play function). Recorder/player 111 includes a link to receiver 113 through switch 112 to record commercials on the disk (record function). In one embodiment, the interface between headend computer 114 and recorder/player 111 is an RS-232 link that accepts either individual control commands or a complete program or script for execution. Such commands include, for example, the position command, which positions recorder/player 111 at the beginning of the desired commercial, the play command, which plays the commercial once positioned, and erase commend and then the record command, which records a new commercial from receiver 113 at a desired location on the recorder/player 111, following positioning. Genlock to the network is performed by recorder/player 111.

In one embodiment of this invention, recorder/player 111 includes error detection codes for the play, record, and position functions. If headend computer issues an erroneous command or if recorder/player 111 cannot process a command or program, recorder/player 111 returns an error code to headend computer 114. Headend computer 114 is then responsible for handling the error condition, such as by providing another one or more instructions and/or sending an alarm to central computer 115 located at central control facility 102

Switch

Figure 2:
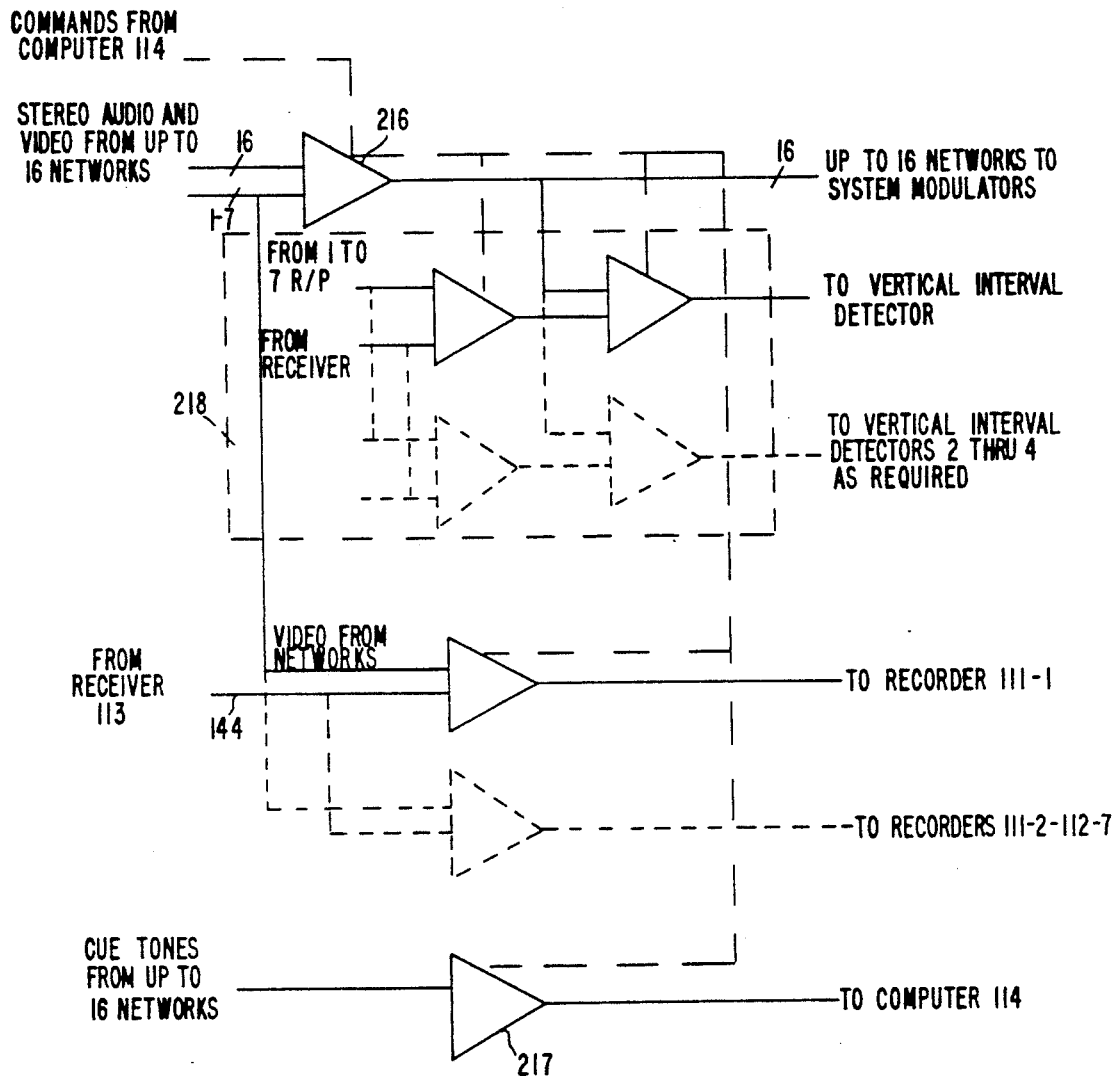
FIG. 2 is a diagram depicting one embodiment of switch 112 of the embodiment of FIG. 1.

Switch 112 allows both the record and play functions to properly occur. In the record function, switch 112 connects headend receiver 113 to recorder/player 111. In the play function, switch 112 connects recorder/player 111 to the proper network for commercial insertion. One embodiment of switch 112 is shown in FIG. 2, and includes the following components:

1. Cross point grid 216

This set of cross points allows the connection of sixteen networks per headend computer to recorder/player 111. Receiver 113 and recorder/player 111 utilize this grid for the record and playback functions, and Genlock.

2. Cue tone detector 217

This component monitors all networks for a commercial insert cue tone and passes this information to headend computer 114.

3. Vertical interval detector (VID) 218

This component links up to the either receiver (for recordings) or (on playback) the network on which an insertion is being performed. This component passes the commercial identifier information in the commercial to headend computer 114. These data are used to perform proper accounting of the playing and recording of commercials.

The sixteen networks at headend 101 that carry commercials terminate the video, audio left, and audio right feeds in the cross connect bridge. All traffic passes through switch 112. Recorder/player 111 includes audio and video termination from switch 112 for the record function, and audio and video termination to switch 112 for the ad insertion function. Receiver 113 includes an audio and video termination to switch 112 for the record function. Headend computer 114 includes link 141 (such as an RS-232 link) to switch 112 for passing data between the switch 112 and headend computer 114, including cue tone, commercial identifier, cross point switch, and network information.

Receiver

Receiver 113 is utilized in the record function. Receiver is tuned to the proper satellite/transponder for commercial receipt. Receiver 113 includes video, audio left, and audio right links 144 to switch 112 which are terminated on one cross point location of switch 112. When recording is to occur, switch 112 (under control of headend computer 114 via link 141) cross connects receiver 113 to recorder/player 111 to accomplish the record function. In one embodiment, receiver 113 utilizes existing RF signals from a headend owned and operated satellite antenna and LNB.

In one embodiment, receiver 113 includes link 143 (such as an RS-232 connection) to headend computer 114 and is capable of receiving instructions as to which transponder receiver 113 should be tuned to. In an embodiment in which receiver 113 is remotely tunable, headend computer 114 is capable of adjusting the frequency of receiver 113 to allow reception from a variety of transponders.

Headend Computer

Headend computer 114 is the controller of the equipment of headend 101. Headend computer 114 is capable of operating more than one switch 112 and recorder/player 111. Headend computer 114 receives the daily schedule from central computer 115, for example, via leased or dial up telephone line. Based upon this daily schedule, headend computer 114 determines what commercials need to be erased from recorder/player 111 and executes instructions to recorder/player 111 in order to erase those unneeded commercials. Headend computer 114 also determines which commercials will be received via receiver 113 and need to be recorded and where they should be inserted on recorder/player 111. Headend 114 also determines the desired satellite/transponder and tunes receiver 113 accordingly. At the time for recording, headend computer 114 monitors switch 112 via link 141. A commercial identifier along with timing information is passed for each commercial being sent via satellite 120 for recording. When headend computer 114 determines a commercial received by receiver 113 needs to be recorded by this cable system, recorded computer 114 sends a message to recorder/player 111 to position it at the proper recording frame. At the proper time headend computer 114 instructs recorder/player 111 to begin recording the received commercial and how many frames to record. Headend 114 computer counts the frames being recorded to ensure all frames are recorded properly. This procedure is repeated for each commercial received by receiver 13 which needs to be recorded for use by this cable system.

During the daily commercial insertion time window, headend computer 114 determines from the schedule the sequence commercials need to be played, the network they will be played on, and the time window for the playing. When the cue tone is passed from switch 112 to the headend computer 114, headend computer 114 determines the correct timing for the commercial playing and issues a play command to recorder/player 111 and a cross point close command to switch 112. Switch 112 disconnects the network feed and substitutes the commercial being played by recorder/player 111 and at the same time passes the commercial frame identifiers back to headend computer 114 via link 141 as the commercial is playing. Headend computer 114 times the commercial to determine when the commercial has finished, at which time headend computer 114 instructs switch 112 to return the cross point to the network. Headend computer 114 verifies what frames were sent and develops an execution report for real time or delayed transmission to central computer 115. This sequence is repeated for all commercials that need to be played for a given period of time.

If a commercial does not play due to lack of cue tone or a collision, headend computer 114 logs this information. Periodically (for example, daily), central computer 115 communicates to headend computer 114 the schedule for the next time period. In one embodiment of this invention, central computer 115 communicates this information to computer 114 via a leased or dial up telephone line. Headend computer 114 passes to central computer 115 information indicating all commercials that played as well as any commercials or frames that did not play per schedule. Since satellite uplinks are relatively expensive, headend computer 114 communicates information to central computer 115 typically over dialup or leased telephone lines and this communication can take place at the same or different times as does the schedule transmission from central computer 115 to headend computer 114. In one embodiment, central computer 115 makes telephone connection with headend computer 114 to transmit the schedule for the next time period, and then receives the reporting information from headend computer 114 over the same communications link. In one embodiment, hub computers 130 are installed between central computer 115 and Headend computers 114 to be used as a Telecommunications concentrator.

In one embodiment, headend computer 114 is capable of producing a report on a local monitor screen of the schedule of commercials for the viewing by the local headend operator, if required.

Error Detection

Recorder/player 111 is capable of issuing a series of error messages relating to all the commands issued by headend computer 114. Headend computer 114 is capable of determining if there is a problem with recorder/player 111 and, if so, informs central computer 115 immediately. Headend computer 114 monitors the play identifier information and determines if the process is not operating properly and immediately notifies central computer 115 and receiver 113. All commands to switch 112, recorder/player 111, and receiver 115 are positively acknowledged by the receiving device. Central computer 115 receives demand calls, for example on dial up telephone lines, from headend computer 114 when there are immediate error reports to send. Central computer 115 formats error reports for immediate action when received from a headend computer 114.

Central Computer

Central computer 115 is the main control point, which stores all scheduling information for all headends. In one embodiment, this scheduling information for all headends is stored in central computer 115 for a predetermined period of time, for example, for a rolling three month period. All avails that are available to be sold are posted by headend, by network, by hour. On a periodic (e.g., daily) basis central computer 115 develops a list of all commercials that need to be transmitted via the uplink that evening. Central computer 115 transmits to each headend computer 114 the schedule for that headend for the next time period. Each headend 114 responds with all the information concerning the verification and error reporting pertaining to the schedule for the prior time period. Central computer 115 receives all record and play error reports and formats these data for the central control personnel. The central computer must maintain a log of every disk and what commercials reside at each headend, and at what disk location. This will allow the central computer to tell each headend what to erase and what to record on every day. This will also allow the central computer to match the daily schedule with the commercials in the field and determine what commercials need to be transmitted that day. The central computer will direct the headend computer where to write each commercials as part of the daily scheduling process.

Central computer 115 also performs billing, traffic, and sales support functions. Central computer 115 is capable of creating a bill to each advertising agency reflecting the commercial played (affidavit), location, network time slot, and the bill for the avail. This will be done, for example, daily, summarized weekly, and monthly for actual bill issuance. These billing data are also used to generate the appropriate revenue to the multiple system operators (MSO's) reflecting the usage of their avails.

Production Facilities

Production facility 116 is capable of periodically (e.g., daily) producing a set of high quality tapes of all commercials that need to be transmitted to the headends. Control information (commercial identification, synchronization characters, start and stop recording characters) are inserted into the commercials, as supplied by central computer 115. The production facilities personnel are responsible for assembling the proper tapes for transmission as directed by the central computer.

When a headend computer 114 notifies the central computer that a record function wasn't handled correctly the production facilities and central control personnel must determine how to best send the commercial to the proper headend. For example, if a relatively few errors are reported to central computer 115 by various headends, the central computer 115 may instruct those headends to substitute a different commercial or to not insert the erroneously received commercial at the appropriate time. Alternatively, if many errors are noted by various headends, central computer 115 will schedule a retransmission time during which erroneously received commercials will be retransmitted for receiving again. In an alternative embodiment, commercials are sent more than once and, if a headend experiences error in receiving a given commercial during its first transmission, it will automatically or in response to instructions from central computer 115, attempt to record the commercial subsequently.

Uplink facility 117 is the point where, on a periodic basis, the commercials needing transmission to the various headends are sent via satellite 120. Central control computer 115 determines what satellite/transponder is to be used and provides this information to uplink 117 or to the uplink personnel. At the scheduled time, the tape containing the selected commercials for transmission to the various headends is uplinked to the correct satellite/transponder.

In one embodiment, commercials are given a unique eight character identification. This identifier is used for scheduling and for the uplink record processing. The eight character code is inserted in each commercial for future reference. The central computer stores these data in a data file which also contains the name and address of the advertiser and the date the commercial was submitted. Control information about storage is also conveniently included in this data file.

Each advertising agency is assigned a unique identifier. This identifier is associated with a commercial used in a particular avail (for billing purposes). The data includes the advertising agency name, address, and any special billing information. All summary billing information utilize this identifier to associate bills to the proper agency.

Once a commercial is complete (30 frames per second for the commercial length), the eight character commercial identification is inserted in the vertical interval of the standard NTSC TV signal. These data are used to verify the playing of the commercial on the correct network at the correct time. For recording purposes, the production personnel also add control characters at the beginning and end of the commercial. These control characters are not part of the commercial that will play on the network. Rather, they are stripped off at the headend by the recording process.

The invention now being fully described, it will be apparent to one of ordinary skill in the art that many changes and modifications can be made thereto without departing from the spirit or scope of the appended claims.

What is claimed is:

1. A video system comprising:
   a source of commercial messages;
   a central computer for storing information defining which of said commercial messages are to be aired on selected ones of a plurality of video distribution systems;
   transmission means responsive to said central computer for simultaneously transmitting to said plurality of video distribution systems all of said commercial messages which are to be aired by at least one of said plurality of video distributed systems during a predetermined time period; and
   for each of said plurality of video distribution systems:
   a receiver for receiving said commercial messages transmitted by said transmission means;
   a headend computer for receiving information from said central computer indicating which of said commercial messages are to be aired by said video distribution system, and at approximately what time, and on which of a plurality of networks of said video distribution system;
   recording means responsive to said headend computer for recording only those ones of said commercial messages to be aired by said video distribution system during said predetermined period of time;
   playback means for playing back said commercial messages as stored by said recording means, at desired times;
   means for inserting said commercial messages as played back, on a desired one of said networks;
   a monitoring device for monitoring said commercial messages as they are inserted into a network;
   a data storage device for storing data relating to said monitored commercial messages; and
   a data transmission device for transmitting said data related to said monitored commercial messages to said central computer.

2. A system as in claim 1 wherein said playback means comprises a video player and switch means for routing said commercial messages for insertion to a desired one of said networks.

3. A system as in claim 2 wherein said playback means further comprises:
   monitoring means for monitoring a network and detecting a cut tone transmitted on said network; and
   means responsive to said monitoring means for initiating playback of said commercial messages.

4. A video system comprising: a source of commercial messages;
   a central computer for storing information defining which of said commercial messages are to be aired on selected ones of a plurality of video distribution systems;
   transmission means responsive to said central computer for simultaneously transmitting to said plurality of video distribution systems all of said commercial messages which are to be aired by at least one of said plurality of video distributed systems during a predetermined time period; and
   for each of said plurality of video distribution systems:
   a receiver for receiving said commercial messages transmitted by said transmission means;
   a headend computer for receiving information from said central computer indicating which of said commercial messages are to be aired by said video distribution system, and at approximately what time, and on which of a plurality of networks of said video distribution system;
   recording means responsive to said headend computer for recording only those ones of said commercial messages to be aired by said video distribution system during said predetermined period of time;
   playback means for playing back said commercial messages as stored by said recording means, at desired times;
   means for inserting said commercial messages as played
   back, on a desired one of said networks; a monitoring device for monitoring said commercial messages as they are recorded;
   a data storage device for storing data relating to said monitored commercial messages; and
   a data transmission device for transmitting said data relating to the recording of said commercial messages to said central computer.

5. A system as in claim 4 wherein said central computer further comprises means for causing the retransmission of one or more commercial messages which have not been properly recorded by one or more of said video distribution systems.

6. A video system comprising:
   a source of commercial messages;
   a central computer for storing information defining which of said commercial messages are to be aired on selected ones of plurality of video distribution systems;
   transmission means responsive to said central computer for simultaneously transmitting to said plurality of video distribution systems all of said commercial messages which are to be aired by at least one of said plurality of video distribution systems during a predetermined time period; and
   for each of said plurality of video distribution systems:
   a receiver for receiving said commercial messages transmitted by said transmission means;
   recording means for recording one or more of said commercial messages;
   playback means for playing back said selected ones of said commercial messages as stored by said recording means, at desired times;
   means for inserting said commercial messages as played back, on a desire done of a plurality of networks transmitted by said video distribution system;
   a monitoring device for monitoring said commercial messages as they are inserted into networks transmitted by said video distribution system;
   a data storage device for storing data relating to said monitored commercial message; and
   a data transmission device for transmitting said dta relating to sad monitored commercial messages to said central computer.

7. A video system comprising:
   source of commercial message;

a central computer for storing information defining which of said commercial messages are to be aired on selected ones of plurality of video distribution systems;

transmission means responsive to said central computer for simultaneously transmitting to said plurality of video distribution systems all of said commercial messages which are to be aired by at least one of said plurality of video distribution systems during a predetermined time period; and for each of said plurality of video distribution systems:

a receiver for receiving said commercial messages transmitted by said transmission means;

recording means for recording one or more of said commercial messages;

playback means for playing back said commercial messages as stored by said recording means, at desired times;

means for inserting said commercial messages as played back, on a desired one of a plurality of networks transmitted by said video distribution system;

a monitoring device for monitoring said commercial messages as they are recorded;

a data storage device for storing data provided by said monitoring device relating to the recording of said commercial messages; and a data transmission device for transmitting said data relating to the recording of said commercial messages to said central computer.

8. A system as in claim 7 wherein said central computer further comprises means for causing the retransmission of one or more commercial messages which have not been properly recorded by one or more of said video distribution systems.

* * * * *